United States Patent

Herring

[11] Patent Number: 5,946,671
[45] Date of Patent: Aug. 31, 1999

[54] POSTAGE METER

[75] Inventor: William James Herring, Brentwood, United Kingdom

[73] Assignee: Neopost Limited, Essex, United Kingdom

[21] Appl. No.: 08/787,957

[22] Filed: Jan. 23, 1997

[30] Foreign Application Priority Data

Jan. 26, 1996 [GB] United Kingdom .................... 9601588

[51] Int. Cl.⁶ .................................................. G07B 17/00
[52] U.S. Cl. ............................. 705/404; 705/30; 705/401
[58] Field of Search ............................. 705/30, 400, 401, 705/404

[56] References Cited

U.S. PATENT DOCUMENTS

| | | | |
|---|---|---|---|
| 4,168,533 | 9/1979 | Schwartz | 705/403 |
| 4,511,793 | 4/1985 | Racanelli | 705/404 |
| 4,731,749 | 3/1988 | Kirschner et al. | 705/404 |
| 4,812,994 | 3/1989 | Taylor et al. | 705/410 |
| 4,817,004 | 3/1989 | Kroll et al. | 364/464.02 |
| 4,908,770 | 3/1990 | Breault et al. | 705/404 |
| 4,962,459 | 10/1990 | Mallozzi et al. | 705/404 |
| 5,384,708 | 1/1995 | Collins et al. | 705/404 |
| 5,408,416 | 4/1995 | Gilham | 705/406 |
| 5,717,596 | 2/1998 | Bernard et al. | 705/404 |

FOREIGN PATENT DOCUMENTS

| | | |
|---|---|---|
| 0085385 | 8/1983 | European Pat. Off. . |
| 0376488 | 7/1990 | European Pat. Off. . |
| 0550994 | 7/1993 | European Pat. Off. . |

OTHER PUBLICATIONS

Derwent Abstract Accession No. 94–265560/33 and EP612038 (NEOPOST) Aug. 24, 1994.

*Primary Examiner*—Edward R. Cosimano
*Attorney, Agent, or Firm*—Shoemaker and Mattare, Ltd.

[57] ABSTRACT

A postage meter having facilities for departmental accounting is disclosed. A non-volatile department memory is provided for each department, each department memory storing data relating to a specific department. An additional single non-volatile memory is also provided. During each franking transaction in respect of a department, current data is read from the associated department memory and is written to the additional memory. Current data from the department memory is updated in respect of the transaction and the updated data is written to the department memory. The provision of the single additional memory enables department data in respect of each department to be recovered in the event of a fault occurring during the transaction.

6 Claims, 2 Drawing Sheets

POSTAGE METER

BACKGROUND OF THE INVENTION

This invention relates to postage meters and in particular to the storage of data in postage meters.

Known postage meters are provided with electronic circuits to carry out accounting and control functions and printing means operated by the electronic circuits to print postage information on mail items. The electronic circuits include memories to store accounting data, the memories generally include a descending register to store a value of credit available for use in franking mail items, an ascending register for storing an accumulated value of postage charge used by the postage meter in franking mail items and an items register for storing a count of the number of mail items on which postage data has been printed by the postage meter in franking those items. The memories are non-volatile so that in the event of interruption of the supply of power to the postage meter, due for example to a fault or power down of the postage meter, the accounting data is retained and not lost.

In order to provide verifiable storage of the accounting data, it has been customary to provide a plurality of replications of the registers in the memories and for example usually two separate memory devices are provided and two of each register is provided in each memory device. Thus in the event of a fault occurring in one of the registers resulting in corruption of data stored in that register, the data can be ascertained from the other copies of that register. During operation of the postage meter in carrying out a franking operation, the accounting circuits check that the data content of all replications of each register are in agreement and, in the event that the data in any replication of a register is inconsistent with data in other replications of that register, the accounting circuits cause inhibition of use of the postage meter for franking operations. Continued use of the postage meter is possible only after examination and correction of the data by an authorized person.

It has also been proposed to provide a facility in or in association with postage meters for departmental accounting to enable maintenance of separate accounting records for each of a number of different departments or organizations using the same postage meter. For this purpose, a set of subsidiary registers is provided, one register for each department respectively, and in response to an input indicating a specific selected department the postage meter accounting circuits operate not only to generate and store accounting data for storage in the registers used by the postal authority for determination of credit available in the meter and expenditure of postage charge by the meter but also to generate and store data relating to use of the postage meter in franking mail items on behalf of the selected department.

It will be appreciated that the accounting data stored in those registers storing accounting data in respect of overall use of the postage meter is critical since payment by a user to a postal authority for postage charge dispensed by the meter is dependent upon that data. Any error in that data would result either in the postal authority losing revenue or the user paying a greater amount than the postage charge dispensed. However with departmental account records, any error in those departmental records does not result in incorrect payment between legal entities, i.e. a user company and the postal authority, but only inaccuracy in accounting between departments of a single legal entity. Accordingly it has been customary to treat departmental records as being noncritical.

SUMMARIES OF THE INVENTION

According to one aspect of the invention a postage meter includes accounting and control means operable to perform accounting and control functions in respect of an operation to frank a mail item with a postage charge; nonvolatile memory means to store critical account data relating to use of the postage meter in performing franking operations; a set of non-volatile department registers to store departmental account data; means to enable selection of a departmental account; said accounting and control means being operative in response to selection of a departmental account to select one of said set of non-volatile department registers allocated to said selected departmental account; a non-volatile duplicate register; and said accounting and control means being operative during a franking operation to read out current departmental account data stored in the selected department register, to carry out accounting functions in respect of a postage charge applied to a mail item, to update said current departmental account data read out from the selected department register and to write updated departmental account data to said selected department register and said accounting and control means further being operable prior to writing said updated departmental account data to said selected department register to write said current departmental account data to said nonvolatile duplicate register.

According to a another aspect of the invention a postage meter includes accounting and control means operable to perform accounting and control functions in respect of an operation to frank a mail item with a postage charge; a set of non-volatile account registers to store account data; a single duplicate non-volatile register; and said accounting and control means being operative during a franking operation to update current account data stored in a selected one of said set of account registers and to write the updated account data to said selected account register and prior to writing the updated account data to said selected account register to write said current account data to said duplicate register whereby in the event of occurrence of a fault condition or of interruption of supply of power to the postage meter during a franking operation the current account data is stored in at least one of the selected account register and the duplicate register.

BRIEF DESCRIPTION OF THE DRAWING

An embodiment of the invention will be described hereinafter by way of example with reference to the drawings in which:-

DESCRIPTION OF THE PREFERRED EMBODIMENT

Figure 1:
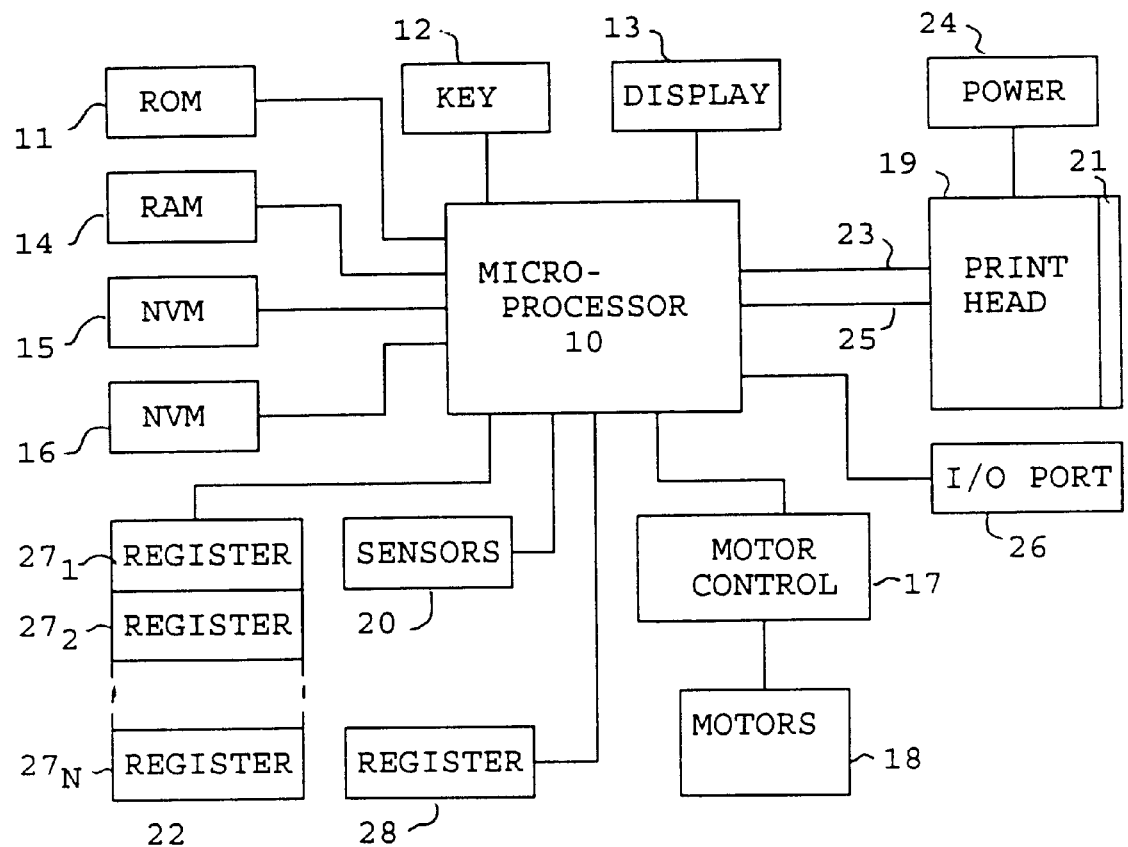
FIG. 1 is a block circuit diagram of a postage meter.

Referring first to FIG. 1, the postage meter includes electronic accounting and control means comprising a micro-processor 10 operating under program routines stored in a read only memory (ROM) 11. A keyboard 12 is provided for input of data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to overall use of the postage meter and which is required to be retained even when the postage meter is not powered. The microprocessor 10 carries out accounting functions in relation to use of the postage meter for franking mail items with postage charges applicable to the mail items. Accounting data relating to use of the postage meter for printing franking impressions representing postage charges for mail items and any other critical data to be retained is stored in the non-volatile memories 15, 16. A motor controller 17 is controlled by the microprocessor 10 to control operation of motors 18 driving feeding means (not shown) for feeding a mail item past a digital print head 19. The digital print head 19 is preferably a thermal print head including selectively energisable thermal printing elements 21. Sensors 20 are provided to sense and monitor feeding of the mail item. The sensors provide signals to the microprocessor to enable the microprocessor to control feeding of the mail item and to selectively energise thermal print elements 21 of the print head at appropriate times as the mail item is fed past the print head. As the mail item is fed past the thermal printing elements 21 of the print head 19, during a printing operation the microprocessor reads print data stored in memory 14 and outputs, on line 23, to the print head 19 in each of a plurality of printing cycles signals selecting those ones of the printing elements 21 which are to be energised in the respective cycle. A pulse of electrical power is supplied to the selected electrothermal printing elements from a power source 24 when a strobe signal is supplied by the microprocessor on line 25 to the print head.

The thermal printing elements 21 are disposed in a line extending transversely to the direction in which the mail item is fed. Energisation of selected thermal printing elements of the print head in a printing cycle causes heating of areas of the ink layer of the thermal transfer ink ribbon adjacent the energised printing elements. Heating of areas of the ink layer causes those heated areas to adhere more strongly to the mail item than the unheated parts of the ink layer so that when the ribbon is peeled from the mail item after passing the print head, the heated areas remain adhered to the mail item to form printed dots in required locations in a row. Since the mail item and thermal transfer ink ribbon are fed past the print head during the printing operation, repeated selection and energisation of selected printing elements in a series of printing cycles results in printing of dots in required positions of a series of rows spaced along the mail item in the direction of feeding of the item. Accordingly a complete printed impression is built up in a row by row manner in the series of printing cycles of a printing operation. An input/output port 26 is provided to enable communication between an external device, such as a data source, and the microprocessor 10.

Departmental registers $27_1, 27_2 \ldots 27_n$ are provided in a further non-volatile memory 22 to enable individual accounting records to be stored in respect of separate departmental accounts. Sufficient departmental registers are provided to enable allocation of a separate one of the registers for each required departmental record respectively. Thus, for example, if ten departmental registers are provided any number of departmental records up to but not exceeding ten be may stored. When a user of the postage meter wishes to use the postage meter for franking mail items, the user inputs the appropriate department identifier by means of the keyboard and the microprocessor 10 selects a corresponding one of the departmental registers $27_1 \ldots 27_n$ allocated to that department for registering accounting data relating to use of the postage meter while that department remains selected. The user then uses the postage meter for the required franking of mail items and as each item is franked the accounting data in the registers of memories 15, 16 is updated and in addition the departmental accounting data in the selected departmental register is updated. Generally the departmental registers for departmental accounting data are required to store only accumulated values of postage charge dispensed by the postage meter when used for each specific department. However if desired the departmental registers may in addition store other accounting data such as items counts and large items counts, the latter relating to items in which the postage charge exceeds a predetermined value.

Heretofore, departmental accounting data has been regarded as non-critical data and only a single register has been provided for departmental an account record. As a result it is not possible to maintain integrity of the departmental accounting data in the event of corruption of the departmental account data. Corruption of the departmental account data may arise as a result of a fault, either in the register itself or in the writing of data to the register, or as a result of loss of power to the postage meter. Integrity of the departmental data could be ensured by providing duplicated registers as for the critical accounting data relating to overall use of the postage meter. However duplication of departmental accounting data registers results in an unacceptable increase in cost of manufacture of the postage meter and furthermore space restrictions for accommodation of electronic components may result in the provision of duplicate departmental registers being impractical.

Integrity of the departmental accounting records is assured without the problems referred to hereinbefore by providing a single duplicate departmental non-volatile register 28. It will be understood that only one department may be selected at any one time. The duplicate departmental register is utilised as a duplicate register for the register $27_1 \ldots 27_n$ of the selected department. At the start of each franking operation, when a department is selected as described hereinbefore the departmental account record stored in that one of the departmental registers $27_1 \ldots 27_n$ allocated to the selected department is read out and written to the duplicate register 28. The departmental account record stored in that one of the selected departmental registers $27_1 \ldots 27_n$ allocated to the selected department is updated, as each franking operation is performed, in accordance with an amount of the postage charge dispensed in respect of franking a mail item. This is accomplished by the microprocessor 10 reading the current value from the departmental register of the selected department, incrementing the current value by the amount of postage charge expended, or to be expended, in the current franking operation to a new value and then writing the new value to that one of the registers $27_1 \ldots 27_n$ allocated to the selected department. Accordingly upon completion of a franking operation, the updated departmental account record is stored in the allocated departmental register. In the event of a power failure during the period required for the microprocessor to carry out accounting operations and resultant corruption of the departmental account data, the departmental account data can be reconstructed from the account data, as it was prior to the current franking operation, stored in the duplicate register 28.

When a new department is selected by a user, the duplicate register will then act as a duplicate of that one of the department registers $27_1 \ldots 27_n$ allocated to the newly selected department. Any previous contents of the duplicate register 28 will be overwritten by the current departmental account data of the newly selected department.

Figure 2:
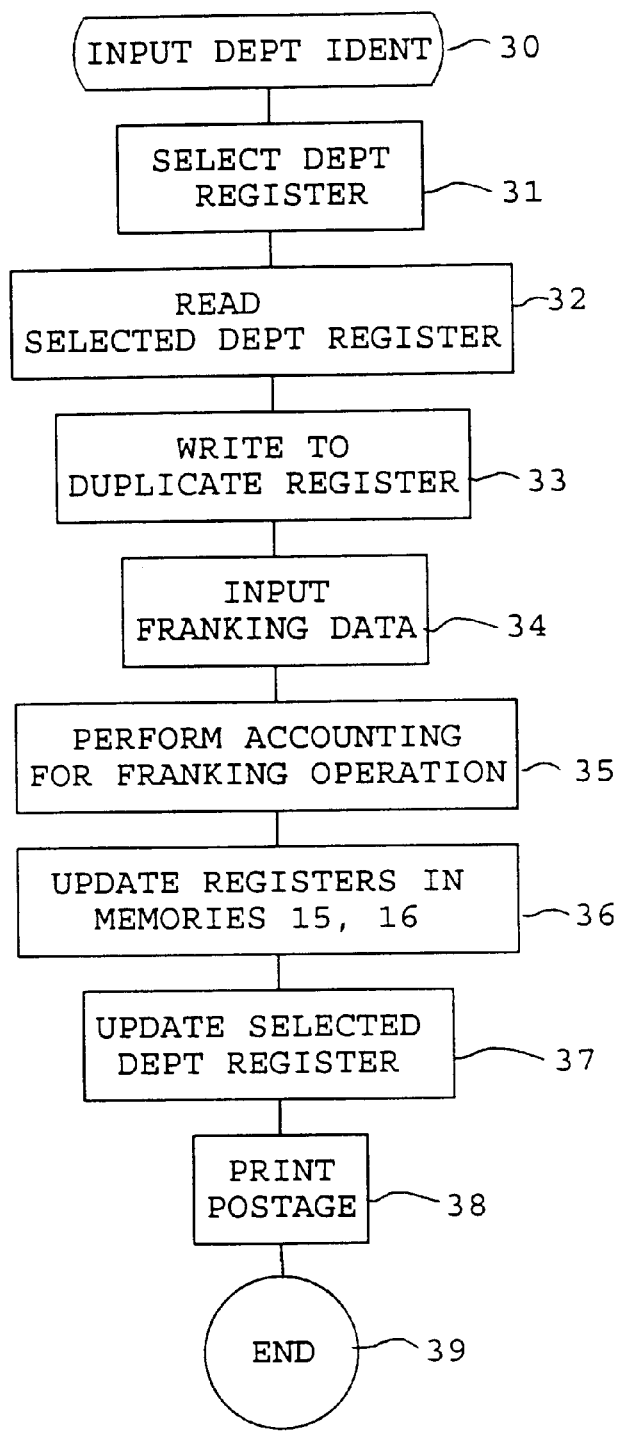
FIG. 2 is a flow chart illustrating steps carried out in use of a postage meter to frank a mail item and to provide departmental accounting.

FIG. 2 illustrates steps carried out in use of a postage meter to frank a mail item and to provide departmental accounting in respect of expenditure in respect of franking the mail item. At the start of a franking operation, a departmental identifier is input (step 30) to select a selected department. The microprocessor 10 selects (step 31) that one of the departmental registers allocated to the selected department. Departmental data stored in that departmental register is read out (step 32) and written (33) to the duplicate register 28. Accordingly the departmental accounting data is stored both in the departmental register allocated to the selected department and in the duplicate register 28. The user then inputs (step 34), by means of the keyboard, data relating to the required franking of a mail item, such data including the postage charge to be expended and to be applied to the mail item. The microprocessor 10 then performs (step 35) accounting functions in respect of the required franking in which critical accounting data in the registers of memories 15, 16 is updated to take account of the postage charge and in which the departmental account data is updated. The microprocessor then writes (step 36) the updated critical accounting data to the registers of memories 15, 16 and writes (step 37) the updated departmental accounting data to the allocated register 27. Finally the microprocessor operates the motor control 16 and the print head 21 to print (step 38) the postage impression on the mail item and the franking operation terminates (step 39).

While the steps of a franking operation in which departmental accounting is carried out are shown as occurring in a sequence in the flow chart of FIG. 2, it is to be understood that the sequence may be modified and for example the accounting operation in respect of departmental data may be carried out separately from accounting in respect of critical data and subsequent to writing the updated critical data to the memories 15, 16. If desired the updated departmental account data may be written to the duplicate register 28.

It will be appreciated that the provision of a single nonvolatile duplicate register storing the same data as stored in another non-volatile register prior to updating the data in the other non-volatile register enables the integrity of that data to be maintained and in the event of corruption of the data occurring during updating of the data assists in reconstruction of the corrupted data. Setting of status flags during the accounting procedure and updating of the data permits retrieval of the appropriate data should a power failure be detected.

I claim:

1. A postage meter including accounting and control means operable to perform accounting and control functions in respect of an operation to frank a mail item with a postage charge; non-volatile memory means to store critical account data relating to use of the postage meter in performing franking operations; a set of non-volatile department registers to store departmental account data; means to enable selection of a departmental account; said accounting and control means being operative in response to selection of a departmental account to select one of said set of non-volatile department registers allocated to said selected departmental account; a non-volatile duplicate register; and said accounting and control means being operative during a franking operation to read out current departmental account data stored in the selected department register, to carry out accounting functions in respect of a postage charge applied to a mail item, to update said current departmental account data read out from the selected department register and to write updated departmental account data to said selected department register and said accounting and control means further being operable prior to writing said updated departmental account data to said selected department register to write said current departmental account data to said non-volatile duplicate register and said non-volatile duplicate register storing said current departmental account data until after the writing of updated departmental account data to said selected department register.

2. A postage meter as claimed in claim 1 wherein the accounting and control means is operative during a franking operation to read current departmental account data from the selected register and to write said current departmental account data to said duplicate register prior to updating said current departmental account data.

3. A postage meter including accounting and control means operable to perform accounting and control functions in respect of an operation to frank a mail item with a postage charge; a set of non-volatile account registers to store account data; a single duplicate nonvolatile register; and said accounting and control means being operative during a franking operation to update current account data stored in a selected one of said set of account registers and to write the updated account data to said selected account register and prior to writing the updated account data to said selected account register to write said current account data to said duplicate register; and said non-volatile duplicate register storing said current departmental account data until after the writing of updated departmental account data to said selected department register whereby in the event of occurrence of a fault condition or of interruption of supply of power to the postage meter during a franking operation the current account data is stored in at least one of the selected account register and the duplicate register.

4. A postage meter as claimed in claim 3 wherein the accounting and control means is operative during a franking operation to read current account data from the selected account register and to write said current account data to said duplicate register prior to updating said current account data.

5. A postage meter including accounting and control means to perform accounting and control functions in respect of postage dispensing operations relating to mail items; non-volatile memory means to store current critical account data relating to use of the postage meter in dispensing postage; a set of non-volatile department registers, each non-volatile department register storing departmental accounting data in respect of a respective department; means operable in a current postage dispensing operation to select one of said non-volatile department registers; a non-volatile duplicate register storing departmental accounting data relating to a postage dispensing operation immediately preceding said current postage dispensing operation;

said accounting and control means being operable in said current postage dispensing operation:

in response to selection of a department to read out current departmental accounting data from the selected department register and overwrite the departmental accounting data stored in the non-volatile duplicate register with said current departmental accounting data;

to perform accounting functions in respect of a postage charge dispensed and the current critical account data to generate new critical account data and to write said new critical account data in the non-volatile memory means; and, after the overwriting of the departmental accounting data stored in the non-volatile duplicate register, to perform accounting functions in respect of the postage charge dispensed and current departmental data read from the selected department register to generate new departmental accounting data and to write said new departmental accounting data in said selected department register; and said non-volatile duplicate register storing said current departmental account data until after the writing of updated departmental account data to said selected department register.

6. A postage meter including accounting and control means to perform accounting and control functions in respect of postage dispensing operations relating to mail items; non-volatile memory means to store current critical account data relating to use of the postage meter in dispensing postage;

a set of non-volatile department registers, each non-volatile department register storing departmental accounting data in respect of a respective department; means operable to select one of said non-volatile department registers; a non-volatile duplicate register storing first departmental accounting data relating to a first postage dispensing operation;

said accounting and control means being operable in a second postage dispensing operation immediately succeeding said first postage dispensing operation:
in response to selection of a first department to read out second departmental accounting data from a first one of said set of department registers and to overwrite the first departmental accounting data stored in the non-volatile duplicate register with said second departmental accounting data;
to perform accounting functions in respect of a first postage charge dispensed and the first critical account data to generate second critical account data and to write said second critical account data in the non-volatile memory means;
after the overwriting of the first departmental accounting data stored in the non-volatile duplicate register, to perform accounting functions in respect of the first postage charge dispensed and second departmental data read from the first one of the set of department registers to generate third departmental accounting data and to write said third departmental accounting data in the first department register; and said accounting and control means being operable in a third postage dispensing operation immediately succeeding said second postage dispensing operation:
in response to selection of a second department to read out fourth departmental accounting data from a second one of said set of department registers and to overwrite the second departmental accounting data stored in the non-volatile duplicate register with said fourth departmental accounting data;
to perform accounting functions in respect of a second postage charge dispensed and the second critical account data to generate third critical account data and to write said third critical account data in the non-volatile memory means;
after the overwriting of the second departmental accounting data stored in the non-volatile duplicate register, to perform accounting functions in respect of the second postage charge dispensed and fourth departmental data read from the second one of the set of department registers to generate fifth departmental accounting data and to write said fifth departmental accounting data in the second department register.

* * * * *